United States Patent
Tao et al.

(10) Patent No.: US 10,231,017 B2
(45) Date of Patent: Mar. 12, 2019

(54) ELECTRONIC DEVICE, CHARGING CONTROL METHOD OF ELECTRONIC DEVICE, BATTERY POWER-LEVEL DISPLAY METHOD OF ELECTRONIC DEVICE, SOURCE DEVICE, AND SINK DEVICE

(71) Applicant: SONY CORPORATION, Tokyo (JP)

(72) Inventors: Akihiko Tao, Kanagawa (JP); Takehiko Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 14/433,105

(22) PCT Filed: Oct. 15, 2013

(86) PCT No.: PCT/JP2013/077885
§ 371 (c)(1),
(2) Date: Apr. 2, 2015

(87) PCT Pub. No.: WO2014/061624
PCT Pub. Date: Apr. 24, 2014

(65) Prior Publication Data
US 2015/0249862 A1     Sep. 3, 2015

(30) Foreign Application Priority Data

Oct. 16, 2012   (JP) ................................ 2012-229143

(51) Int. Cl.
*H04N 21/443*   (2011.01)
*H04N 21/426*   (2011.01)
(Continued)

(52) U.S. Cl.
CPC ..... *H04N 21/4436* (2013.01); *H04N 21/4122* (2013.01); *H04N 21/41407* (2013.01);
(Continued)

(58) Field of Classification Search
None
See application file for complete search history.

(56) References Cited

U.S. PATENT DOCUMENTS

2002/0038432 A1    3/2002  Hsu
2009/0278993 A1*  11/2009  Nishikawa ............. H04N 5/775
                                                          348/723
(Continued)

FOREIGN PATENT DOCUMENTS

EP    2172831 A    4/2010
EP    2461310 A    6/2012
(Continued)

OTHER PUBLICATIONS

Supplementary European Search Report received for European patent application No. 13847566.0, dated Mar. 15, 2016, p. 11.

*Primary Examiner* — Jaweed A Abbaszadeh
*Assistant Examiner* — Cheri L Harrington
(74) *Attorney, Agent, or Firm* — Chip Law Group

(57) ABSTRACT

Successful communication required between external devices is achieved.
A content data processing unit is connected to an external device through a first line. A communication unit is connected to the external device through a second line. The content data processing unit represents, for example, a content data transmitting unit that transmits content data to the external device, or a content data receiving unit that receives the content data from the external device. The communication unit transmits an inquiry signal to the external device through the second line in a state in which the first line is unavailable. For example, in a case where the interface unit is in a standby state, it is possible to inquire a required item to the external device while the state is maintained. Since it is possible to decrease power consumption of the external device as much as possible, it is possible to contribute to saving of energy of the external device.

14 Claims, 13 Drawing Sheets

(51) Int. Cl.
  *H04N 21/436*    (2011.01)
  *H04N 21/4363*   (2011.01)
  *H04N 21/41*     (2011.01)
  *H04N 21/414*    (2011.01)
  *G06F 1/26*      (2006.01)

(52) U.S. Cl.
  CPC ......... *H04N 21/426* (2013.01); *H04N 21/436* (2013.01); *H04N 21/43632* (2013.01); *G06F 1/26* (2013.01)

(56) References Cited

U.S. PATENT DOCUMENTS

| | | | | |
|---|---|---|---|---|
| 2011/0128153 | A1* | 6/2011 | Sims | G06F 1/3203 340/636.1 |
| 2011/0167281 | A1 | 7/2011 | Rathi et al. | |
| 2012/0042185 | A1* | 2/2012 | Lee | G06F 1/266 713/323 |
| 2012/0080954 | A1* | 4/2012 | Gachon | G06F 3/14 307/80 |
| 2012/0204048 | A1 | 8/2012 | Kim | |
| 2012/0221801 | A1* | 8/2012 | Okawa | G06F 1/3212 711/154 |
| 2014/0071172 | A1* | 3/2014 | Hussain | G09G 3/3406 345/690 |

FOREIGN PATENT DOCUMENTS

| | | |
|---|---|---|
| EP | 2495988 A | 9/2012 |
| JP | 2012-109990 A | 11/2011 |
| JP | 2011-244391 A | 12/2011 |
| JP | 2011-229110 A | 6/2012 |

\* cited by examiner

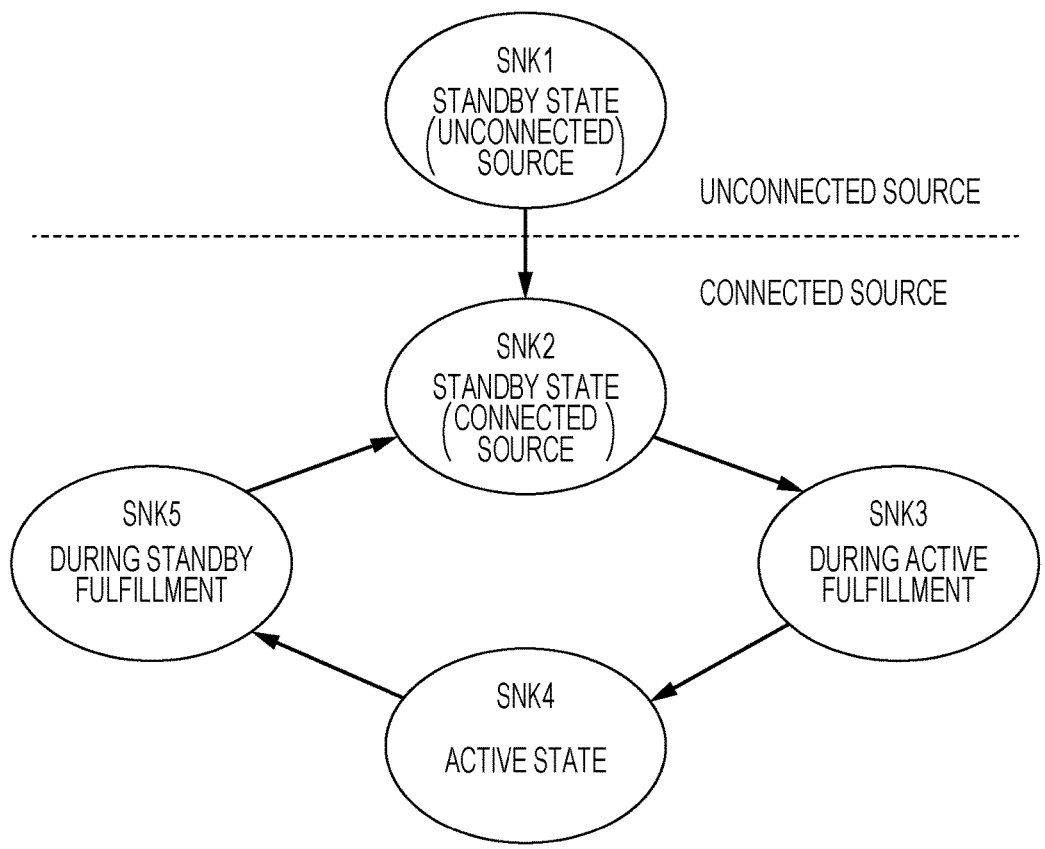

FIG. 10

| OFFSET VALUE | REGISTER NAME | FUNCTION |
|---|---|---|
| 0x00 | ... | ... |
| 0x01 | MHL Version | MHL VERSION NUMBER CORRESPONDING TO DEVICE |
| 0x02 | Device Category | CURRENT SUPPLYING CAPACITY OF DEVICE |
| 0x03 | ... | ... |
| ... | | |

FIG. 11

EXAMPLE OF CONFIGURATION IN A CASE OF VERSION A: 0x41

| | MSB 7 | 6 | 5 | 4 | 3 | 2 | 1 | LSB 0 |
|---|---|---|---|---|---|---|---|---|
| MHL Version | 0 | 1 | 0 | 0 | 0 | 0 | 0 | 1 |

FIG. 12
EXAMPLE OF CONFIGURATION IN A CASE OF 0.9 A: 0 : 1
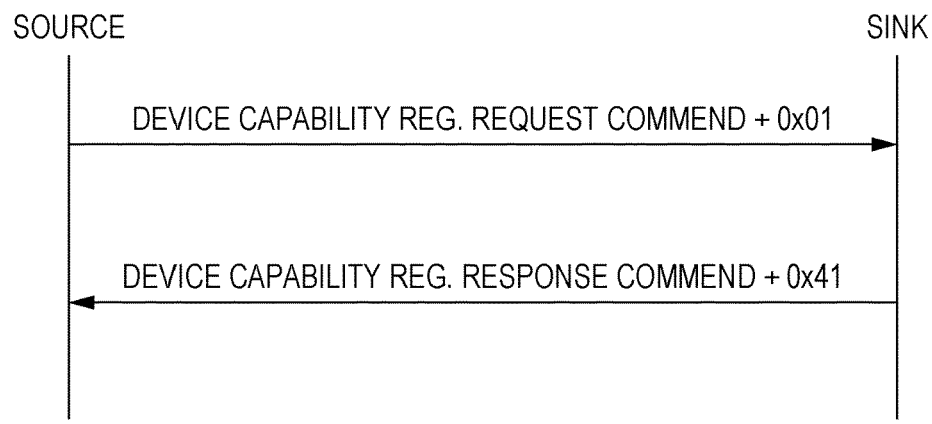
FIG. 13
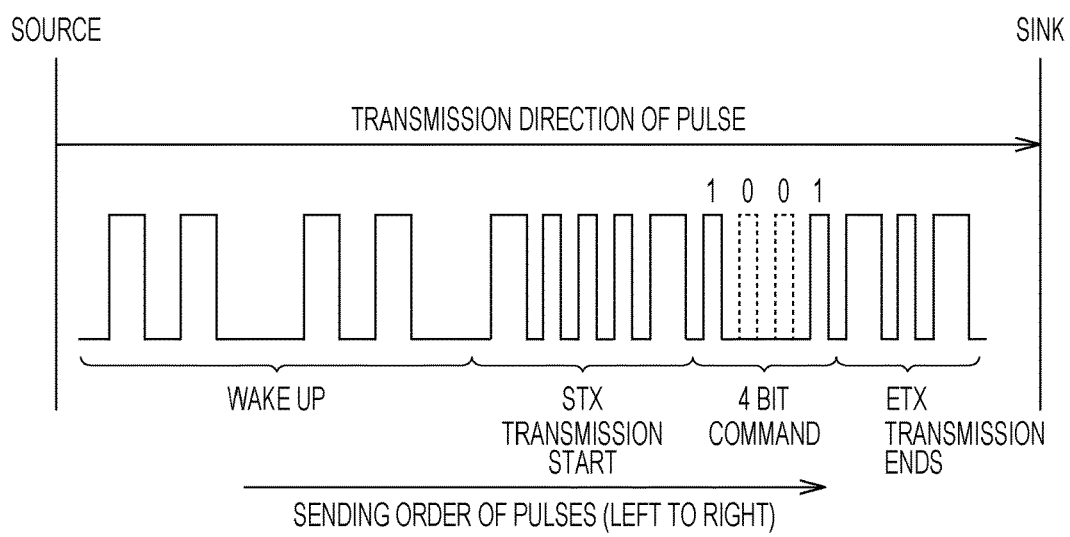
FIG. 14

FIG. 21

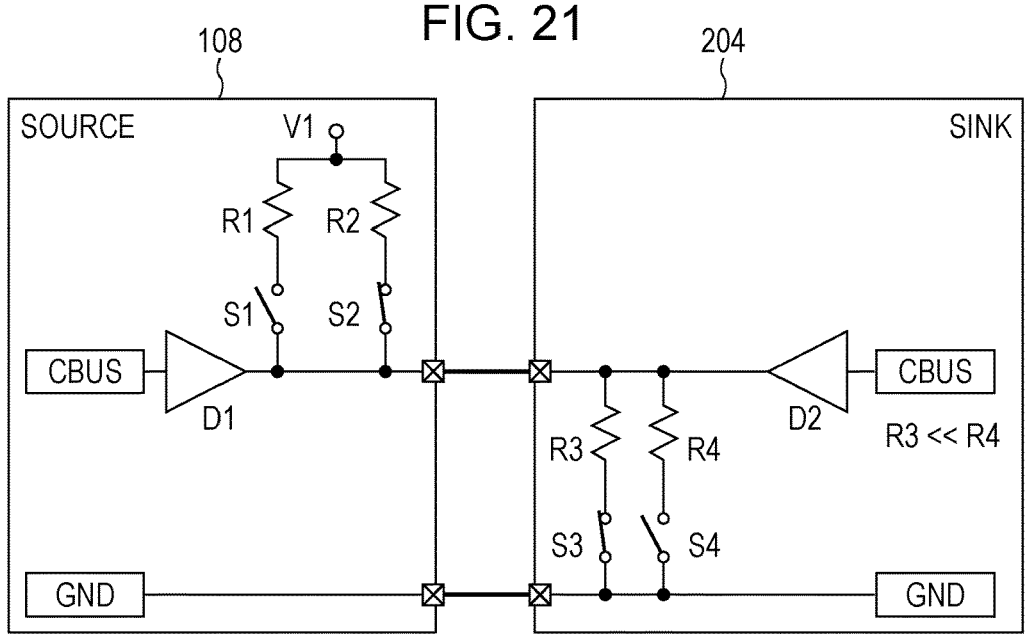

FIG. 22

| 4-BIT VALUE | MEANING |
|---|---|
| 0000 | INQUIRE TIME |
| 0001 | INQUIRE TIME SOURCE |
| 0010 | INQUIRE NATION AND LOCAL DISTRICT |
| 0011 | INQUIRE NATIVE LANGUAGE |
| 0100 | INQUIRE MHL VERSION NUMBER WHICH IS SUPPORTED |
| 0101 | INQUIRE TYPE OF DEVICE (SOURCE, SINK, OR THE LIKE) |
| 0110 | INQUIRE UPPER LIMIT VALUE OF MHL CLOCK |
| 0111 | INQUIRE VENDER ID |
| 1000 | INQUIRE DEVICE ID |
| 1001 | INQUIRE UPPER LIMIT CURRENT VALUE (CURRENT SUPPLYING CAPACITY) |
| 1010 | INQUIRE REMAINING BATTERY POWER |
| 1011 | (Reserved) |
| 1100 | (Reserved) |
| 1101 | (Reserved) |
| 1110 | (Reserved) |
| 1111 | (Reserved) |

ELECTRONIC DEVICE, CHARGING CONTROL METHOD OF ELECTRONIC DEVICE, BATTERY POWER-LEVEL DISPLAY METHOD OF ELECTRONIC DEVICE, SOURCE DEVICE, AND SINK DEVICE

TECHNICAL FIELD

The present invention relates to an electronic device, a charging control method of the electronic device, a battery power-level display method of the electronic device, a source device, and a sink device, and particularly, to an electronic device that transmits content data through a digital interface between external devices, or the like.

BACKGROUND ART

In recent years, for example, as a communication interface through which image or audio data is transmitted from a source device to a sink device at a high speed, a mobile high-definition link (MHL) standard is proposed (for example, see PTL 1). The MHL standard is an interface standard for high-speed video transmission to a mobile device.

In the MHL standard, power of +5 V for charging a battery is supplied from the sink device to the source device through a VBUS line. A current which can be drawn by the source device from the VBUS line varies depending on current supply capability of the sink device. The source device reads the capability of the sink device in advance, ascertains the current supply capability of the sink device, and thus, it is possible to utilize the upper limit current supply capability of the sink device for charging.

CITATION LIST

Patent Literature

PTL 1: Japanese Unexamined Patent Application Publication No. 2011-244391

SUMMARY OF INVENTION

Technical Problem

However, in the MHL standard, only when the sink device is in an active state, it is possible to read the capability of the sink device, but, when the sink device is in a standby state, it is not possible to read the capability. As a result, since the capability of the sink device is unknown when the sink device is in the standby state, it is inconvenient that the current can be used by the source device only until the guaranteed minimum current value (0.1 A) which is defined at each MHL version.

An object of the present invention is to perform successful communication required between external devices.

Solution to Problem

According to the concept of the present technology, there is provided an electronic device including: a content data processing unit that is connected to an external device through a first line; and a communication unit that is connected to the external device through a second line, in which the communication unit transmits an inquiry signal to the external device through the second line in a state in which the first line is unavailable.

The present technology includes the content data processing unit and the communication unit. The content data processing unit is connected to the external device through the first line. The communication unit is connected to the external device through the second line. The content data processing unit represents, for example, a content data transmitting unit that transmits content data to the external device, or a content data receiving unit that receives the content data from the external device.

The communication unit transmits the inquiry signal to the external device through the second line in the state in which the first line is unavailable. For example, the communication unit may recognize that the first line is in a state of being unavailable based on a resistance value between the second line and a ground line. Here, for example, when the interface unit is in a standby state, the first line enters the unavailable state and it is not possible to transmit the content data through the first line.

In the present technology, the inquiry signal is transmitted to the external device through the second line in the state in which the first line is unavailable. Therefore, in the state in which the first line is unavailable, for example, in a case where the interface unit is in a standby state, it is possible to inquire a required item to the external device while the standby state is maintained. In this case, since it is possible to decrease power consumption of the external device as much as possible, it is possible to contribute to saving of energy of the external device.

Additionally, in the present technology, for example, the communication unit may receive a response signal in response to the inquiry signal from the external device through the second line in a state in which the first line is unavailable. Here, the response signal in response to the inquiry signal may be received from the external device through a line other than the second line. It is considered that a power supply line or the like is used as the line other than the second line.

In addition, in the present technology, for example, the electronic device may further include: a charging unit that is connected to a power supply unit of the external device through a third line; and a charging control unit that controls a charging operation of the charging unit, in which the inquiry signal may indicate a signal generated to inquire current supply capability of the external device, and in which the charging control unit may control a value of a current which is drawn from the third line by the charging unit, in accordance with the response signal. For example, the response signal may contain information of an upper limit current value. In addition, the response signal may contain information representing a type of upper limit current value. In this case, for example, even in a case where the interface unit is in the standby state, it is possible to acquire the response signal containing information of the current supply capability from the external device while the standby state is maintained, the current supply capability of the external device is used up to the upper limit for charging, and it is possible to achieve fast charging.

In addition, in the present technology, for example, the electronic device according may further include: a power supply unit that is connected to a charging unit of the external device through a third line; a display unit; and a display control unit that controls a display operation of the display unit, in which the inquiry signal may indicate a signal generated to inquire a battery power level of the external device, and in which the display control unit may display battery power level information of the external device on the display unit, in accordance with the response signal. In this case, for example, even in the case where the interface unit is in the standby state, it is possible to acquire the battery power-level information from the external device while the standby state is maintained, and to display the battery power-level information on the display unit.

In addition, according to another concept of the present technology, there is provided an electronic device including: a digital interface unit that is connected to a digital interface unit of an external device through a transmission path, in which the digital interface unit includes a content data processing unit that is connected to the digital interface unit of the external device through a first line; and a communication unit that is connected to the digital interface unit of the external device through a second line, in which the communication unit transmits an inquiry signal to the digital interface unit of the external device through the second line when the digital interface unit of the external device is in a standby state.

The present technology includes the digital interface unit that is connected to the digital interface unit of the external device through the transmission path. The digital interface unit includes the content data processing unit and the communication unit. The content data processing unit is connected to the external device through the first line. The communication unit is connected to the external device through the second line. The content data processing unit represents, for example, a content data transmitting unit that transmits content data to the external device, or a content data receiving unit that receives the content data from the external device.

The communication unit transmits an inquiry signal to the digital interface unit of the external device through the second line when the digital interface unit of the external device is in the standby state. Here, when the digital interface unit is in the standby state, the first line enters the unavailable state and it is not possible to transmit the content data through the first line. For example, the digital interface may indicate the interface having a mobile high-definition link (MHL) standard.

In the present technology, the inquiry signal is transmitted to the external device through the second line when the digital interface unit of the external device is in the standby state. Therefore, in a case where the digital interface unit of the external device is in the standby state, it is possible to inquire a required item to the external device while the standby state is maintained. In this case, since it is possible to decrease power consumption of the external device as much as possible, it is possible to contribute to saving of energy of the external device.

Additionally, in the present technology, for example, the communication unit may receive a response signal in response to the inquiry signal from the digital interface unit of the external device through the second line when the digital interface unit of the external device is in the standby state. Here, the response signal in response to the inquiry signal may be received from the external device through a line other than the second line. It is considered that a power supply line or the like is used as the line other than the second line.

In addition, according to still another concept of the present technology, there is provided a source device including: a content data transmitting unit that is connected to a sink device through a first line; a communication unit that is connected to the sink device through a second line; a charging unit that is connected to a power supply unit of the sink device through a third line; and a charging control unit that controls a charging operation of the charging unit, in which, when the first line is in a state of being unavailable, the communication unit transmits an inquiry signal generated to inquire current supply capability of the sink device through the second line and receives a response signal in response to the inquiry signal from the source device; and in which the charging control unit controls a value of a current which is drawn from the third line by the charging unit, in accordance with the response signal.

In addition, according to still another concept of the present technology, there is provided a sink device including: a content data receiving unit that is connected to a source device through a first line; a communication unit that is connected to the source device through a second line; a power supply unit that is connected to a charging unit of the source device through a third line; a display unit; and a display control unit that controls a display operation of the display unit, in which, when the first line is in a state of being unavailable, the communication unit transmits an inquiry signal generated to inquire a battery power level of the source device through the second line to the source device and receives a response signal in response to the inquiry signal from the source device; and in which the display control unit displays battery power level information of the external device on the display unit, in accordance with the response signal.

Advantageous Effects of Invention

According to the present technology, it is possible to perform successful communication required between external devices.

BRIEF DESCRIPTION OF DRAWINGS

FIG. 4 is a diagram illustrating an example of a pin assignment of an MHL standard.

FIG. 5 is a diagram for illustrating state transition of the MHL receiving unit (MHL sink) of the television.

FIG. 10 is a diagram illustrating a format (a snippet) of a device capability register.

FIG. 11 is a diagram illustrating an example of a configuration of an MHL version of the device capability register.

FIG. 12 is a diagram illustrating an example of a configuration of a device category of the device capability register.

FIG. 13 is a sequence diagram illustrating a reading procedure of the MHL version of the MHL receiving unit (MHL sink) by the MHL transmitting unit (MHL source) using a command on the CBUS.

FIG. 14 is a diagram illustrating an example of an upper limit current value request pulse which is sent from the MHL transmitting unit (MHL source) to the MHL receiving unit (MHL sink).

FIG. 21 is a diagram for illustrating still another mechanism in which the pulse is transmitted between the MHL receiving unit and the MHL transmitting unit using the CBUS.

FIG. 22 is a diagram illustrating an example of a correlation between a value of a 4-bit command which configures a request pulse and a meaning thereof.

DESCRIPTION OF EMBODIMENTS

Here, an aspect to carry out the invention (hereinafter, referred to as "embodiment") will be described. Additionally, the description will be provided in the following order.
1. Embodiment
2. Modification Example

1. EMBODIMENT

Figure 1:
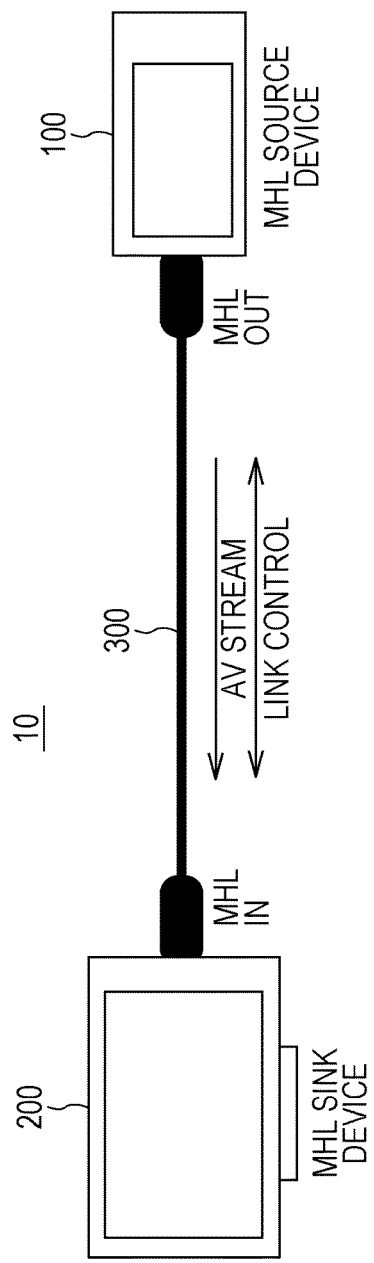
FIG. 1 is a block diagram illustrating a configuration example of an image display system as an embodiment of the present technology.

[Image Display System]
FIG. 1 illustrates a configuration example of an image display system 10 as an embodiment. The image display system 10 is configured to include a mobile phone 100 as a mobile high-definition link (MHL) source device, and a television 200 as an MHL sink device. These devices are connected to each other by an MHL cable 300.

An outline of the MHL is described. The MHL is mainly an audio visual (AV) digital interface standard for a mobile device. The MHL causes the MHL source device and the MHL sink device to be connected to each other by an MHL cable and contents such as a video image, a still image, or a sound loaded in the MHL source device are reproduced by the MHL sink device (AV stream in one direction). In addition, control such as EDID reading, HDCP authentication, register reading/writing, or remote control is performed between the devices by transmitting and receiving a DDC command and an MHL sideband channel (MSC) command (bidirectional link control).

Figure 2:
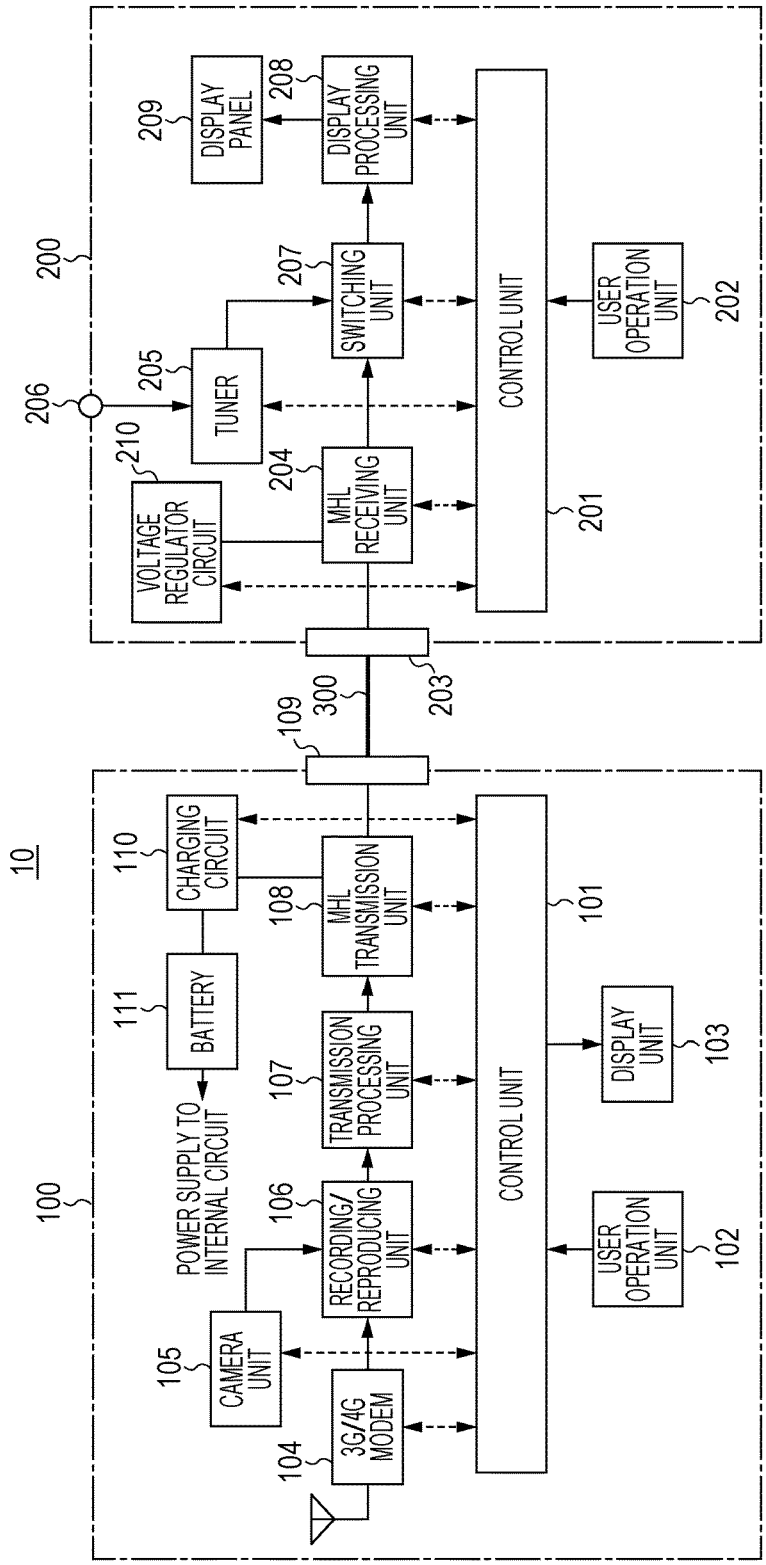
FIG. 2 is a block diagram illustrating a configuration example of a mobile phone and a television which configure the image display system.

[Configuration Examples of Mobile Phone and Television]
FIG. 2 illustrates a configuration example of the mobile phone 100 and the television 200 which configure the image display system. First, the mobile phone 100 is described. The mobile phone 100 includes a control unit 101, a user operation unit 102, and a display unit 103. In addition, the mobile phone 100 includes a 3G/4G modem 104, a camera unit 105, a recording/reproducing unit 106, a transmission processing unit 107, an MHL transmitting unit (MHL source) 108, and an MHL terminal 109. Further, the mobile phone 100 includes a charging circuit 110 and a battery 111.

The control unit 101 controls an operation of each unit of the mobile phone 100. The user operation unit 102 and the display unit 103 configure a user interface and are connected to the control unit 101. The user operation unit 102 is configured to have a key, a button, or a dial which is disposed on a housing (not illustrated) of the mobile phone 100, a touch panel disposed on the display surface of the display unit 103, or the like. The display unit 103 is configured of a liquid crystal display (LCD), an organic electro luminescence (EL), or the like.

The 3G/4G modem 104 performs mobile phone communication. The camera unit 105 performs imaging of a moving image or a still image. The recording/reproducing unit 106 drives a recording medium such as an embedded memory (nonvolatile memory) or a memory card and performs recording and reproducing (writing and reading). The recording/reproducing unit 106 performs recording and reproducing of a call performed through the modem 104.

In addition, the recording/reproducing unit 106 performs recording and reproducing of image data of a moving image and a still image or audio data which is acquired through the modem 104 and performs recording and reproducing of image data of a moving image and a still image or audio data which is obtained by being imaged by the camera unit (including a microphone) 105. Additionally, the recording/reproducing unit 106 performs a codec process in which the image data of the moving image and the still image which is acquired by being imaged by the camera unit 105 is subjected to data compression.

A user makes an instruction from the user operation unit 102 and thereby, recording contents in the recording medium in the recording/reproducing unit 106 can be displayed as a contents list. In addition, when the user designates any content on the contents list from the user operation unit 102, data of the designated content from the recording medium in the recording/reproducing unit 106 is reproduced and is transferred to the transmission processing unit 107.

Additionally, a case is considered, in which the image data and the audio data acquired by the 3G/4G modem 104 or the image data and the audio data obtained by the camera unit 105 are transmitted in real time. In this case, the content data is not illustrated in the drawings but is directly transferred to the transmission processing unit 107. In addition, a case is also considered, in which, after a memory card is inserted into another device and content data is written, the memory card is mounted on the recording/reproducing unit 106 and the content data is transmitted to the transmission processing unit 107.

The transmission processing unit 107 performs a process on data such as a moving image, a still image, or a sound which is reproduced in the recording/reproducing unit 106 and is transmitted to the television 200 such that the data has an appropriate form. For example, a transmission format and a video format of 3D image data are converted such that the data can be processed in the television 200. The MHL transmitting unit 108 configures a digital interface unit. The MHL transmitting unit 108 is connected to the MHL terminal 109. The MHL transmitting unit 108 transmits the data such as the image or sound processed in the transmission processing unit 107 from the MHL terminal 109 to the television 200 through the MHL cable 300 in one direction by communicating in accordance with the MHL standard. The MHL transmitting unit 108 will be described later in detail.

The charging circuit 110 charges the battery 111. The charging circuit 110 is connected to a power supply unit (voltage regulator circuit) of the television 200 through a power supply line (VBUS). The charging circuit 110 causes a drawing current determined by the control unit 101 to be drawn from the power supply line and to charge the battery 111. The battery 111 supplies power to an internal circuit of the mobile phone 100. A control process of the drawing current in the control unit 101 will be described later in detail.

Next, the television 200 will be described. The television 200 includes a control unit 201, a user operation unit 202, an MHL terminal 203, and an MHL receiving unit (MHL sink) 204. In addition, the television 200 includes a tuner 205, an antenna terminal 206, a switching unit 207, a display processing unit 208, a display panel 209, and a voltage regulator circuit 210. The control unit 201 controls an operation of each unit of the television 200. The user operation unit 202 configures a user interface and is connected to the control unit 201. The user operation unit 202 is configured to have a key, a button, or a dial which is disposed on a housing (not illustrated) of the television 200, a remote control, or the like.

The MHL receiving unit 204 configures the digital interface unit. The MHL receiving unit 204 is connected to the MHL terminal 203. The MHL receiving unit 204 receives data such as an image or a sound which is transmitted, in one direction, from the MHL transmitting unit 108 of the mobile phone 100 which is connected to the MHL receiving unit through the MHL cable 300, by communicating in accordance with the MHL standard. The MHL receiving unit 204 supplies the received image data to the switching unit 207. Additionally, the sound data received by the MHL receiving unit 204 is supplied to a switching unit (not illustrated) for sound data. The MHL receiving unit 204 will be described later in detail.

The tuner 205 receives BS broadcasting, digital terrestrial broadcasting, or the like. A broadcasting signal caught by an antenna (not illustrated) connected to the antenna terminal 206 is supplied to the tuner 205. The tuner 205 acquires image data (video signal) and sound data of a predetermined program based on the broadcasting signal. The switching unit 207 selectively extracts the image data received by the MHL receiving unit 204 or the image data acquired by the tuner 205.

The display processing unit 208 performs a process of superimposing a subtitle such as a closed caption, graphics, or the like on the image data extracted by the switching unit 207. In addition, the display processing unit 208 performs a scaling process and an image quality improving process on the image data extracted by the switching unit 207 and then, obtains image data for display. The display panel 209 displays an image formed by the image data for display which is obtained by the display processing unit 208. The display panel 209 is configured of, for example, a liquid crystal display (LCD), an organic electro luminescence (EL), and a plasma display panel (PDP).

The voltage regulator circuit 210 configures the power supply unit. The voltage regulator circuit 210 supplies power to the television 200. In addition, the voltage regulator circuit 210 supplies power to the mobile phone 110 through the power supply line.

[Configuration Examples of MHL Transmitting Unit and MHL Receiving Unit]

Figure 3:
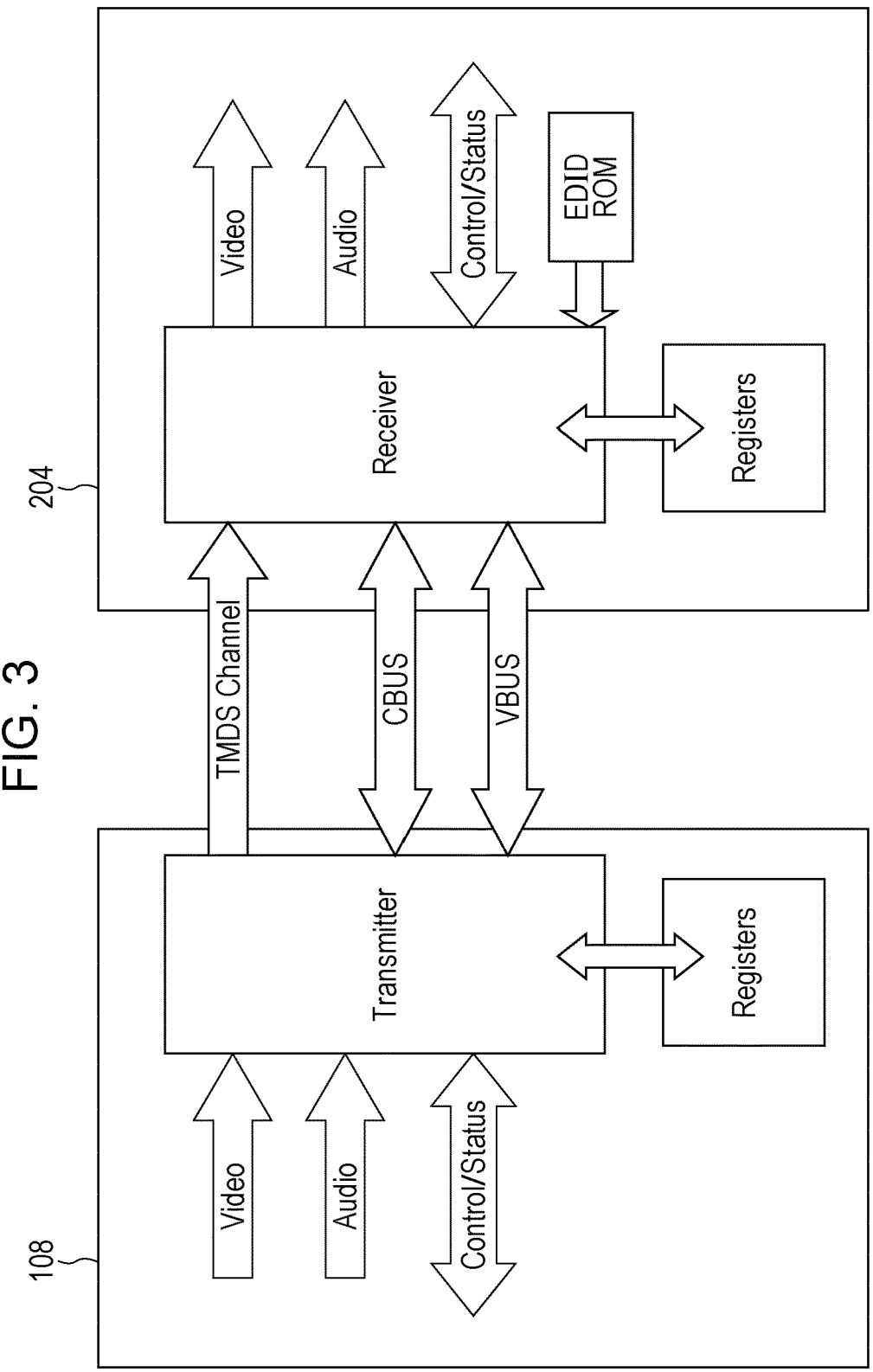
FIG. 3 is a diagram illustrating a configuration example of an MHL transmitting unit of the mobile phone which is an MHL source device and an MHL receiving unit of the television which is an MHL sink device.

FIG. 3 illustrates a configuration example of the MHL transmitting unit 108 of the mobile phone 100 in FIG. 2 and the MHL receiving unit 204 of the television 200. The MHL transmitting unit 108 includes a transmitter and the MHL receiving unit 204 includes a receiver. The MHL transmitting unit 108 and the MHL receiving unit 204 are connected to each other through pins of five lines (MHL+, MHL−, CBUS, VBUS, and GND) and the MHL cable 300. A pin assignment varies depending on a connector. FIG. 4 illustrates an example of the pin assignment.

"MHL+" and "MHL−" are a twisted pair and transmits an AV stream and a synchronized signal (MHL clock) thereof. CBUS is used to transmit a DDC command and an MSC command in a bidirectional manner. The DDC command is used for the EDID reading or the HDCP authentication. In addition, the MSC command is used to control the EDID reading, read and write of various registers, a remote control, or the like. VBUS is used to supply power of +5 V to the MHL source device from the MHL sink device.

[State of MHL Sink Device and MHL Source Device]

A state which can be taken by the MHL receiving unit (MHL sink) 204 and the MHL transmitting unit (MNL source) 108 is described. Here, the MHL receiving unit 204 is described as a "SINK" and the MHL transmitting unit 108 is described as a "SOURCE".

First, a state which is taken by the sink is described. FIG. 5 illustrates a state transition of the sink. The sink is in a connection state to the source and has five states as illustrated in the drawing. "SNK1" represents a state (non-connection of source) in which the sink is in a standby state (the sink is in a power save mode) and it is not possible to recognize the connection of the source. "SNK2" represents a state in which the sink is in the standby state (the sink is in a power save mode) and the source is connected.

"SNK3" represents a transitional state in which the sink receives an active request from the source side and a process which is necessary for transition is performed. "SNK4" represents that the sink is in an active state. Only in this state, the sink can transmit a command through the CBUS. In addition, only in this state, video and audio transmission can be performed through an MHL+/MHL− line from the source to the sink. "SNK5" represents a transitional state in which the sink returns to the standby state by a request from the source or the sink.

Figure 6:
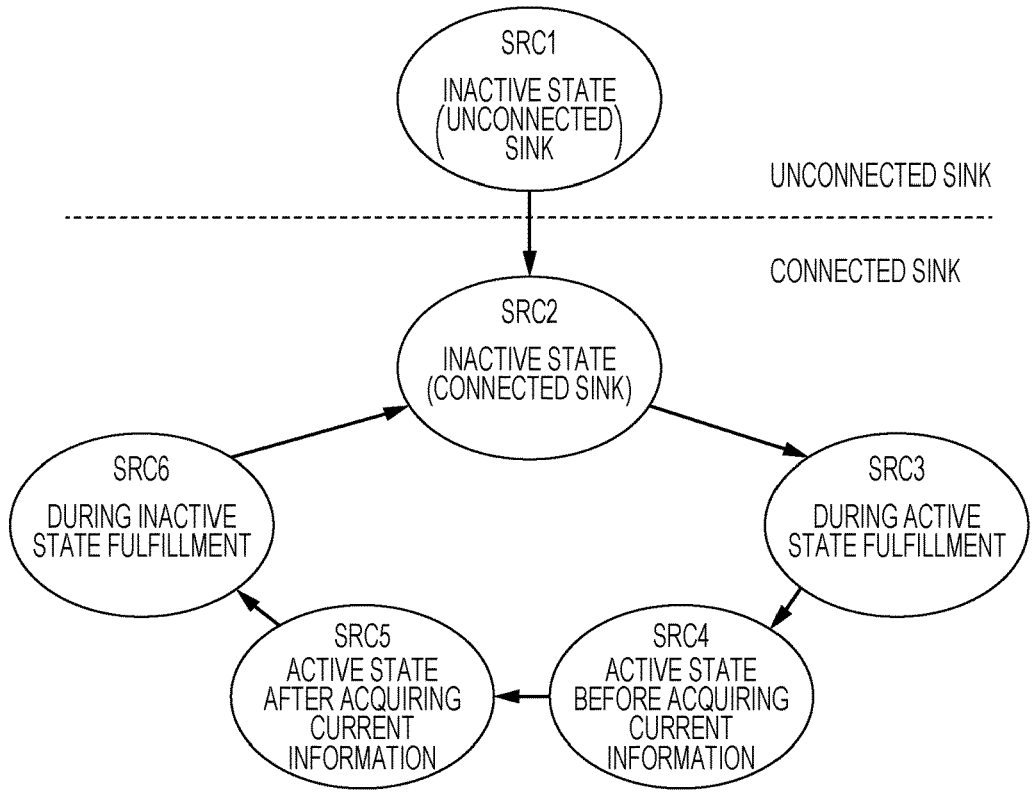
FIG. 6 is a diagram for illustrating state transition of the MHL transmitting unit (MHL source) of the mobile phone.

Next, a state which is taken by the source is described. FIG. 6 illustrates a state transition of the source. The source is in a connection state to the sink and has six states as illustrated in the drawing. "SRC1" represents a state (non-connection of sink) in which the source is in an inactive state and it is not possible to recognize the connection of the sink. "SRC2" represents a state in which the source is in the inactive state and is only electrically connected to the sink. At this time, the state of the sink is "SNK2".

"SRC3" represents a transitional state in which the source transmits an active request to the sink side and a process which is necessary for transition is performed. At this time, the state of the sink is "SNK3". "SRC4" represents a state in which the source is in an active state, and it is before current supply capability of the sink is acquired, and the current supply capability of the sink is not known. At this time, the state of the sink is "SNK4". "SRC5" represents a state in which the source is in an active state and it is after the current supply capability of the sink is acquired. At this time, the state of the sink is "SNK4".

In "SRC4" and "SRC5", the source can transmit a command through the CBUS. In addition, video and audio transmission, that is, content data transmission can be performed through the MHL+/MHL− line from the source to the sink. "SRC6" represents a transitional state in which the source returns to the inactive state by a request from the source or the sink. At this time, the state of the sink is "SNK5".

[CBUS Concept at the Time of MHL cable Connection]

Figure 7:
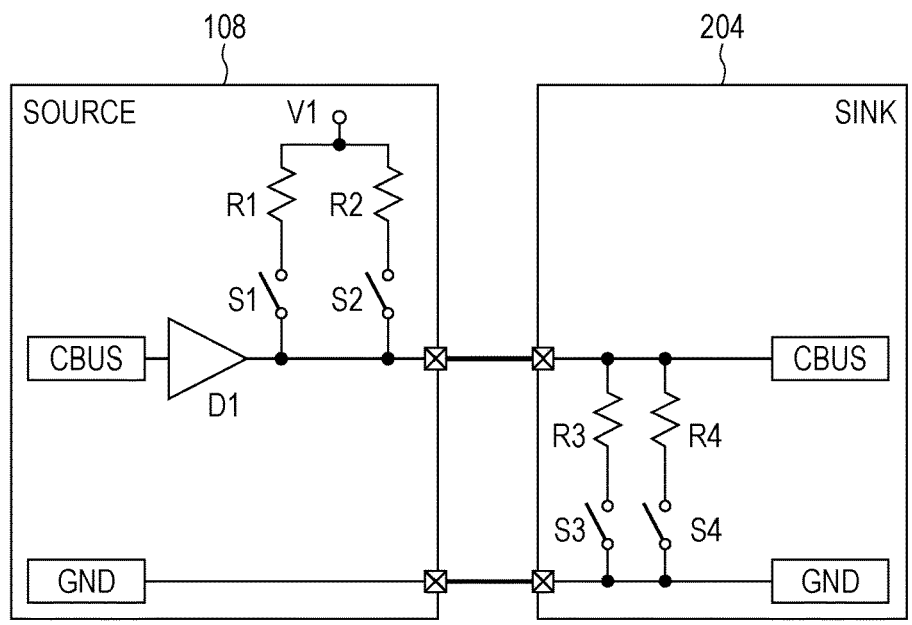
FIG. 7 is a diagram illustrating a concept of CBUS when the MHL receiving unit (MHL sink) and the MHL transmitting unit (MHL source) are connected to each other through the MHL cable.

FIG. 7 illustrates a concept of the CBUS when the MHL receiving unit (MHL sink) 204 and the MHL transmitting unit (MHL source) 108 are connected to each other through the MHL cable 300. Here, the MHL receiving unit 204 is described as a "SINK" and the MHL transmitting unit 108 is described as a "SOURCE".

For example, when the state of the sink side is "SNK2" (standby state), the MHL receiving unit 204 has a resistance value between CBUS-GND as R3 (S3 is closed and S4 is opened). In addition, in "SNK2", the sink is in a power save mode. At this time, the sink causes only a standby circuit of an MHL unit to be in an energized state and causes the other circuits of the MHL unit to be in a de-energized state. In the standby circuit, it is possible to detect a voltage change and a pulse width of about tens of milliseconds of the CBUS.

In an initial state, the source side is pulled up at a voltage V1 and resistance R2 (S1 is opened and S2 is closed). Then, the source monitors the resistance value between CBUS-GND and, when the voltage between CBUS-GND is divided to R2 and R3, the source detects the sink in "SNK2" (standby state) and the source itself is transited to "SRC2". That is, the source recognizes that the sink is in "SNK2" (standby state) based on the resistance value between CBUS-GND. In addition, the source starts to draw a current from the VBUS (not illustrated in FIG. 7) with 0.1 A as an upper limit.

Figure 8:
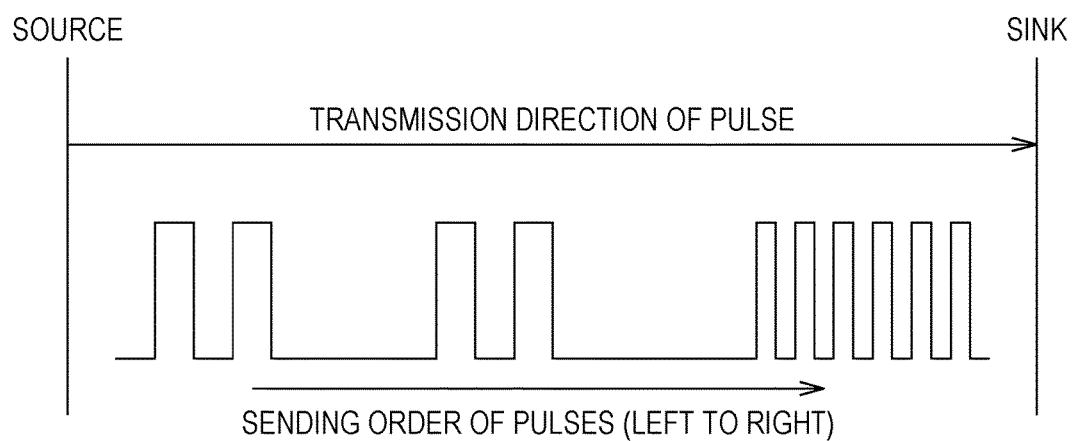
FIG. 8 is a diagram illustrating an active request pulse which is sent from the MHL transmitting unit (MHL source) to the MHL receiving unit (MHL sink).

When the source issues an active request to the sink, the source transmits a unique pulse illustrated in FIG. 8, that is, an active request pulse to the sink and transition to "SRC3" is performed to the source on the CBUS. In FIG. 8, a transition direction of the pulse is from the source to the sink. In addition, a pattern of the pulse which is transmitted is sequentially transmitted from the left direction to the right direction. A first half of the pulse width is defined as 20 mS to 60 mS.

When the sink detects a pulse in the first half in the standby circuit, the transition of the sink to "SNK3" is performed and the other circuits except for the standby state circuit of the MHL unit are in an energized state. Then, by continuous detection of a pulse having a width of 0.1 mS in the second half, the resistance value between CBUS-GND in FIG. 7 switches to R4 (S3 is opened and S4 is closed) and transition to "SNK4" (active state) is performed. When the entirety of MHL units are in the energized state, bidirectional communication of 1 Mbit/sec can be performed on the CBUS and, between source-sink, it is possible to transmit and receive the request of the DDC command and MSC command and the response command.

A voltage between CBUS-GND changes by dividing to R2 and R4 and then, the source knows that the transition of the sink to "SNK4" is performed. After a pull-up resistance value switches from R2 to R1 (S1 is closed and S2 is opened), the transition of the source itself to "SRC4" is performed. The detailed description will be provided later; however, at this state, the source acquires information from the sink using a command and determines current supply capability of the sink side. Then, an amount of the current drawn from the VBUS is raised up in a range in which the upper limit value is not exceeded and the transition of the source to "SRC5" is performed.

[Charging Current Control in Mobile Phone]

Charging current control in the control unit 101 of the mobile phone 100 is described. In the MHL standard, power of 5 V for battery charging is supplied to the source device from the sink device through the VBUS. In addition, at this time, the maximum possible current drawn by the source varies by the MHL version.

For example, it is assumed that an MHL version A has 0.5 A, an MHL version B has 0.9 A or 1.5 A. Whether the current supply capability of a certain sink has any one of the cases described above can be determined by reading device capability registers inside the sink.

First, a case where the MHL receiving unit (MHL sink) 204 of the television 200 is in "SNK4" (active state) (refer to FIG. 5) is described. In this case, the control unit 101 acquires information of the current supply capability of the MHL receiving unit 204 side through the MHL transmitting unit (MHL source) 108 and the charging voltage is determined as follows. Then, the control unit 101 controls the charging circuit 110 such that the determined charging current is drawn from the VBUS.

The control unit 101 reads the MHL version (registering the MHL version number corresponding to the device itself) in the device capability register and, in a case of the version A, the charging current is determined to be 0.5 A. In addition, in a case of version B, the control unit 101 refers to a device category (register the current supply capability of the device itself). The device category is shown by combining 2-bit values. The control unit 101 determines that "00" corresponds to 0.5 A, "01" corresponds to 0.9 A, and "01" corresponds to 1.5 A.

Figure 9:
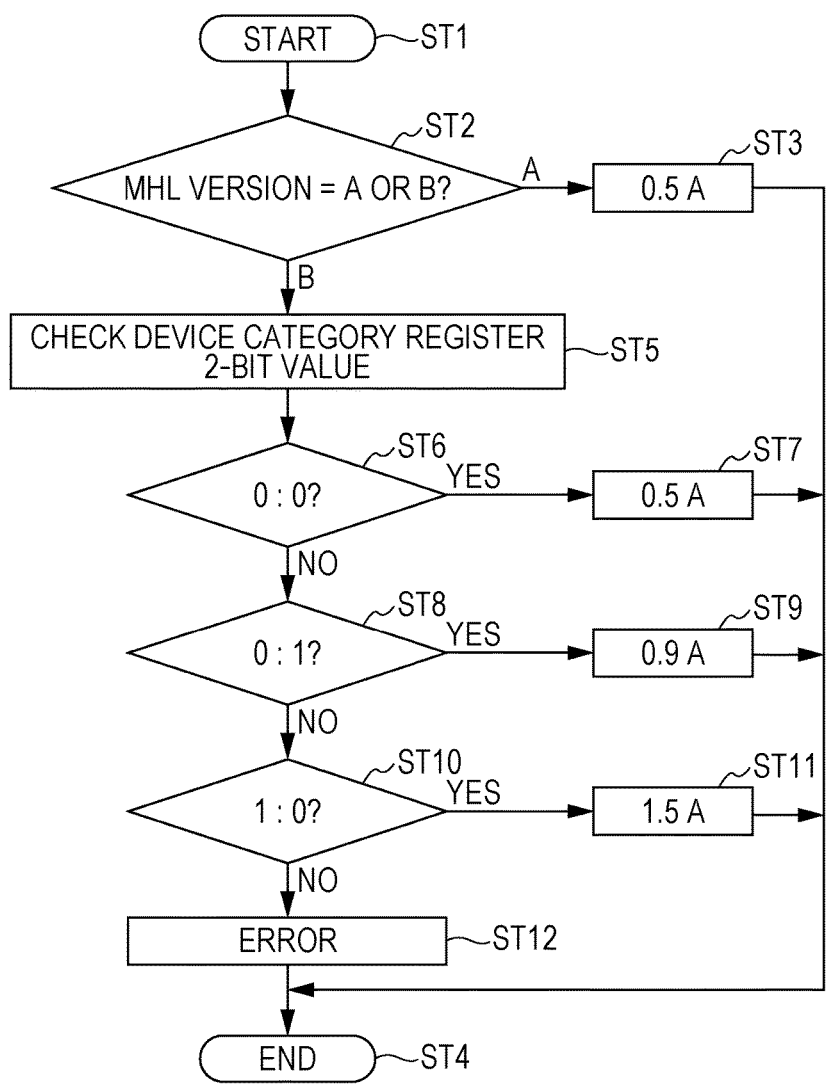
FIG. 9 is a flowchart illustrating an example of a procedure of a determination process of a charging current in a control unit.

A flowchart in FIG. 9 represents an example of a procedure of a determination process of the charging current in the control unit 101. The control unit 101 starts a process in Step ST1 and then, proceeds to a process in Step ST2. In Step ST2, the control unit 101 determines whether or not the MHL version is A and, when the MHL version is A, in Step ST3, the control unit 101 determines that the charging current is 0.5 A and then, in Step ST4, the process ends.

In Step ST2, when the MHL version is not A, that is, when the MHL version is B, the control unit 101 checks the 2-bit value of the device category in Step S5. Then, in Step ST6, the control unit 101 determines whether or not the 2-bit value is "00". When the 2-bit value is "00", in Step ST7, the control unit 101 determines that the charging current is 0.5 A and then, in Step ST4, the process ends.

When the 2-bit value is not "00" in Step ST6, in Step ST8, the control unit 101 determines whether or not the 2-bit value is "01". When the 2-bit value is "01", in Step ST9, the control unit 101 determines that the charging current is 0.9 A and then, in Step ST4, the process ends.

When the 2-bit value is not "01" in Step ST8, in Step ST10, the control unit 101 determines whether or not the 2-bit value is "10". When the 2-bit value is "10", in Step ST11, the control unit 101 determines that the charging current is 1.5 A and then, in Step ST4, the process ends.

When the 2-bit value is not "10" in Step ST10, in Step ST12, the control unit 101 determines that an error occurs and immediately, in Step ST4, the process ends. As above, in a case where the determination process of the charging current ends as an error, the charging current is maintained to be the guaranteed minimum current value of 0.1 A.

FIG. 10 illustrates a format (a snippet) of the device capability register. The device capability register is configured of a plurality of register spaces including the MHL version, device category, or the like. An "offset value" represents a position of the device capability register from the top. For example, the offset value of the MHL version is 0x01, which indicates that the MHL version is positioned at the second byte from the top.

FIG. 11 illustrates an example of a configuration of the MHL version. The example corresponds to an example of a configuration in a case of a version A (0x41). FIG. 12 illustrates an example of a configuration of the device category. The example corresponds to an example of a configuration in a case of 0.9 A, a bit value of the sixth bit corresponds to "0", and a bit value of the fifth bit corresponds to "1".

The MHL transmitting unit (MHL source) 108 performs reading of the device capability register using a command defined on the CBUS. FIG. 13 illustrates a reading procedure of the MHL version of the MHL receiver (MHL sink) 204 by the MHL transmitter 108 using the command on the CBUS. The reading of the device category is performed in accordance with the procedure. Here, the MHL transmitting unit 108 is described as a "SOURCE" and the MHL receiving unit 204 is described as a "SINK".

First, a device capability register request command and an MHL version offset value "0x01" are transmitted to the sink from the source side. In response to this, the sink sends back a device capability register response command and a value registered in the MHL version. FIG. 13 illustrates a case in which 0x41 (version A) is sent as the response. Additionally, in a case where the device category is requested, a request command is issued and then, 0x02 is transmitted.

Next, a case is described, in which the MHL receiving unit (MHL sink) 204 of the television 200 is in "SNK2" (standby state) (refer to FIG. 5). In this case, it is not possible for the MHL transmitting unit (MHL source) 108 to transmit the command illustrated in FIG. 13 described above through the CBUS. Therefore, in this case, it is not possible for the MHL transmitting unit (MHL source) 108 of the mobile phone 100 to acquire information of the current supply capability from the MHL receiving unit 204 side by the same method as in a case where the MHL receiving unit (MHL sink) 204 of the television 200 described above is in "SNK4" (active state).

In a case where the MHL transmitting unit 108 does not acquire the information of the current supply capability of the MHL receiving unit 204 side, in the mobile phone 100, as the charging current drawn from the VBUS, it is possible to use, at most, the guaranteed minimum current value (for example, 0.1 A) defined by each MHL version.

In addition, in some cases, the current supply capability is different on the MHL receiving unit (MHL sink) 204 side between the standby state of "SNK2" and the active state of "SNK4". Therefore, although the MHL transmitting unit 108 performs reading in the active state of "SRC4", the read value is invalid when the MHL transmitting unit 108 returns to the inactive state of "SRC2" passing through the state of "SRC5", and the guaranteed minimum current value (0.1 A) is used at most.

As above, in the mobile phone 100, that is, on the MHL transmitting unit 108 side, the upper limit (0.1 A) of the guaranteed minimum current value is used in each state of "SRC2", "SRC3", and "SRC4". In addition, on the MHL transmitting unit 108 side, the upper limit (for example, the maximum 1.5 A at the version B) of the current supply capability on the MHL receiving unit 204 side is used in the state of "SRC5". Then, when the transition to "SRC2" passing through "SRC6" is performed, the MHL transmitting unit 108 side returns to the guaranteed minimum value.

When the version A is taken as an example, in a case where the current supply capability on the MHL receiving unit (MHL sink) 204 side is 1.5 A, a cycle of SRC2 (0.1 A)→SRC3 (0.1 A)→SRC4 (0.1 A)→SRC5 (1.5 A)→SRC6 (switching from 1.5 A to 0.1 A)→SRC2 (0.1 A) is repeated. That is, when the MHL receiving unit (MHL sink) 204 is in the states other than "SRC5", the upper limit of 0.1 A can be used at most.

As an example of use, a case is considered, in which the mobile phone 100 is connected to the television 200 with only a purpose of simply charging a battery. In this case, the current value which can be used by the mobile phone 100 through the VBUS is the upper limit of 0.1 A. This means that power shortage occurs when charging the battery 111 of the mobile phone 100, thus a long time is taken to charge the battery fully, and the technology is unlikely to be used by a user.

Originally, since the maximum current supply capability of 1.5 A is provided to the MHL receiving unit (MHL sink) 204 side, it is desirable to effectively utilize the maximum current supply capability. In addition, the current supply capability can be used up to the upper limit on the MHL transmitting unit 108 side when the MHL receiving unit 204 is charged in the active state of "SNK4". However, in this case, power consumption on the MHL receiving unit 204, that is, the television side is wastefully increased, compared to "SNK2" in which only the standby circuit is turned on.

Then, according to the embodiment, in a case where the MHL receiving unit (MHL sink) 204 of the television 200 is in "SNK2" (standby state) (refer to FIG. 5), acquisition of the information of the current supply capability on the MHL receiving unit 204 side and determination of the charging current are performed as follows. That is, the MHL transmitting unit (MHL source) 108 generates a pulse having a low speed and a long cycle on the CBUS, uses the pulse as data communication means, and acquires the information of the current supply capability on the MHL receiving unit 204 side. In this manner, when the MHL receiving unit 204 is in the active state or even when the MHL receiving unit 204 is in the standby state, the current supply capability on the MHL receiving unit 204 side can be used up to the upper limit thereof for the battery charging on the MHL transmitting unit 108 side.

When the MHL receiving unit (MHL sink) 204 is in "SNK2" (standby state), the MHL transmitting unit (MHL source) 108 transmits an upper limit current value request pulse as the inquiry signal to the MHL receiving unit (MHL sink) 204. In this case, the MHL transmitting unit 108 transmits a unique pulse waveform, as illustrated in FIG. 14, of which a width of the pulse can be sufficiently recognized through the standby circuit on the MHL receiving unit (MHL sink) 204 and of which a pulse length is substantially about 10 mS to 60 mS, to the MHL receiving unit 204 through the CBUS.

As illustrated in FIG. 14, the upper limit current value request pulse is configured to include, for example, pulses of Wake Up, STX, 4-bit command, and ETX. The MHL transmitting unit 108 sequentially transmits the pulses. Then, for example, "1001" is assigned as the 4-bit command which means an upper limit current value request.

Figure 15:
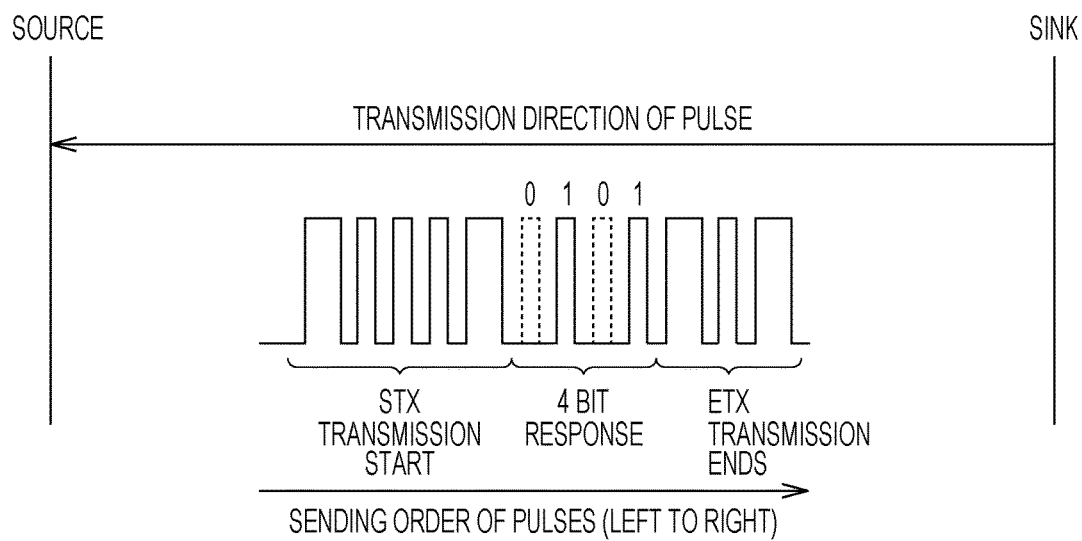
FIG. 15 is a diagram illustrating an example of a response pulse which returns to the MHL transmitting unit (MHL source) from the MHL receiving unit (MHL sink), in response to the upper limit current value request pulse.

The MHL receiving unit 204 responds to the upper limit current value request pulse and transmits, for example, as illustrated in FIG. 15, a response pulse as the response signal to the MHL transmitting unit 108 through the CBUS. As illustrated in FIG. 15, the response pulse is configured to include, for example, pulses of STX, 4-bit response, ETX. The MHL receiving unit 204 sequentially transmits the pulses. The 4-bit response contains information of the upper limit current value. For example, as the 4-bit responses, "0000" which means 0 A (no power supply), "0101" which means 0.5 A, "1001" which means 0.9 A, "1111" which means 1.5 A, or the like is assigned. Additionally, FIG. 15 illustrates a case in which a 4-bit response value is "0101" (0.5 A).

Additionally, in FIG. 14 and FIG. 15, as long as the pulse waveforms of the Wake up, the STX, and the ETX can be recognized through the standby circuit of the MHL receiving unit (MHL sink) 204, another waveform may be used.

The control unit 101 of the mobile phone 100 ascertains the current supply capability (upper limit current value) on the MHL receiving unit 204 side, thus of the television 200, based on the 4-bit response value of the response pulse received by the MHL transmitting unit 108 and determines the charging current. Then, the control unit 101 controls the charging circuit 110 such that the determined charging current is drawn from the VBUS.

As described above, in the image display system 10 illustrated in FIG. 1, the MHL transmitting unit (MHL source) 108 of the mobile phone 100 transmits the upper limit current value request pulse to the MHL receiving unit 204 through the CBUS when the MHL receiving unit (MHL sink) 204 of the television 200 is in the standby state. Therefore, in a case where the MHL receiving unit 204 of the television 200 is in the standby state, it is possible to inquire the upper limit current value to the MHL receiving unit 204 while the standby state is maintained.

Then, in the mobile phone 100, the current supply capability on the MHL receiving unit (MHL sink) 204 side, that is, of the television 200 can be used up to the upper limit thereof for charging and fast charging can be performed. In addition, in the television 200, since the standby state is maintained, it is possible to decrease the power consumption as much as possible and to contribute to saving of energy of the external device.

[Simplification of Request Pulse and Response Pulse]

Then, in the above description, when the MHL receiving unit (MHL sink) 204 of the television 200 is in "SNK2" (standby state), the MHL transmitting unit (MHL source) 108 of the mobile phone 100 transmits the upper limit current value request pulse as illustrated in FIG. 14 to the MHL receiving unit 204. With respect to this, the MHL receiving unit 204 transmits the response pulse as illustrated in FIG. 15 to the MHL transmitting unit 108. However, when the communication in the standby state of the MHL receiving unit (MHL sink) 204 is limited to only acquiring the upper limit current value, it is possible to further simplify the upper limit current value request pulse illustrated in FIG. 14 and the response pulse illustrated in FIG. 15.

Figure 16:
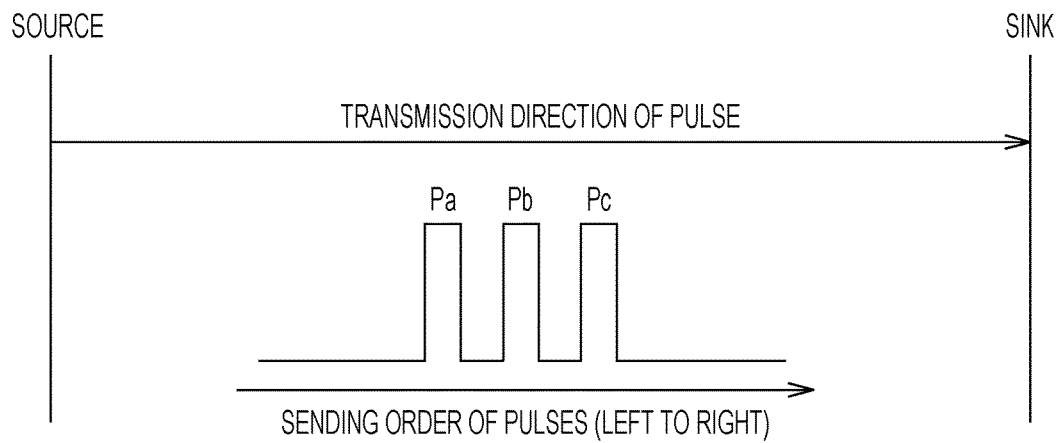
FIG. 16 is a diagram illustrating an example of a simplified upper limit current value request pulse which is sent from the MHL transmitting unit (MHL source) to the MHL receiving unit (MHL sink).

FIG. 16 illustrates an example of the upper limit current value request pulse which is sent from the MHL transmitting unit 108 to the MHL receiving unit 204. The upper limit current value request pulse has a form simplified from the upper limit current value request pulse illustrated in FIG. 14. In order to distinguish the upper limit current value request pulse from the active request pulse illustrated in FIG. 8 described above, a long pulse thereof is configured to have Pa, Pb, and Pc which are continued at an equal interval.

Figure 17:
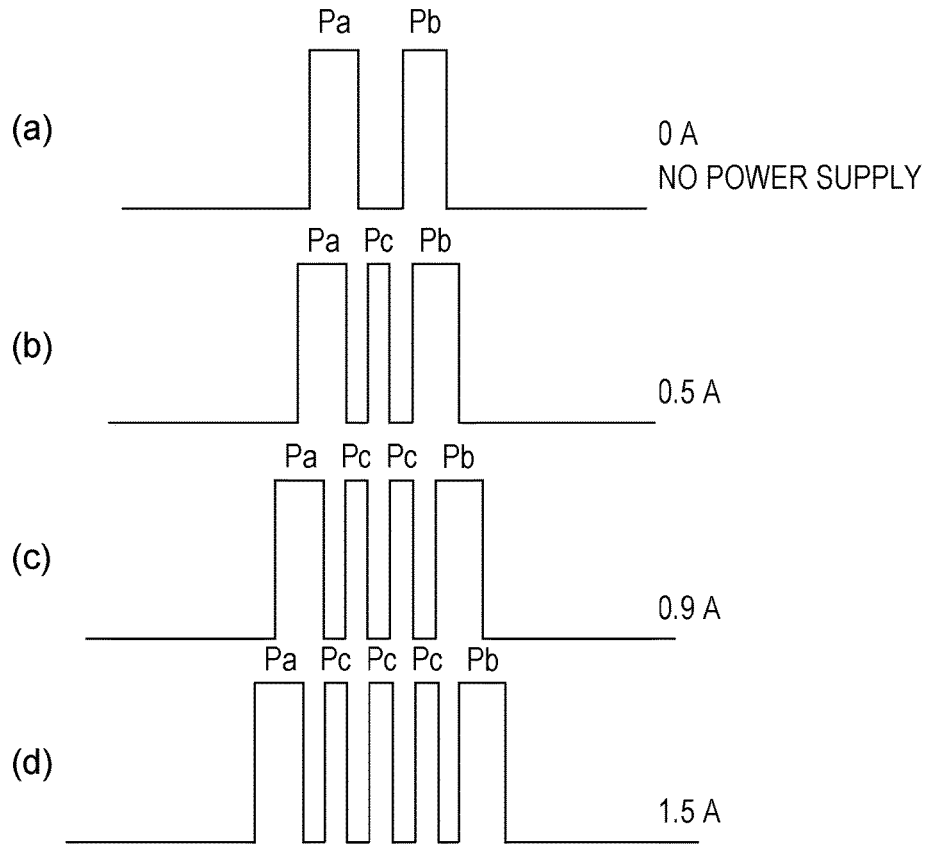
FIG. 17 shows diagrams illustrating an example of a simplified response pulse which is sent to the MHL transmitting unit (MHL source) from the MHL receiving unit (MHL sink), in response to the upper limit current value request pulse.

In addition, FIGS. 17(*a*) to (*d*) illustrate an example of the response pulse which is sent to the MHL transmitting unit 108 from the MHL receiving unit 204. The response pulse has a form simplified from the response pulse illustrated in FIG. 15. The response pulse contains information representing a type of upper limit current value. The response pulses in FIGS. 17(*a*) to (*d*) are examples of a case in which the types of upper limit current value on the MHL receiving unit 204 side are limited to four types of 0 A, 0.5 A, 0.9 A, and 1.5 A.

Figure 18:
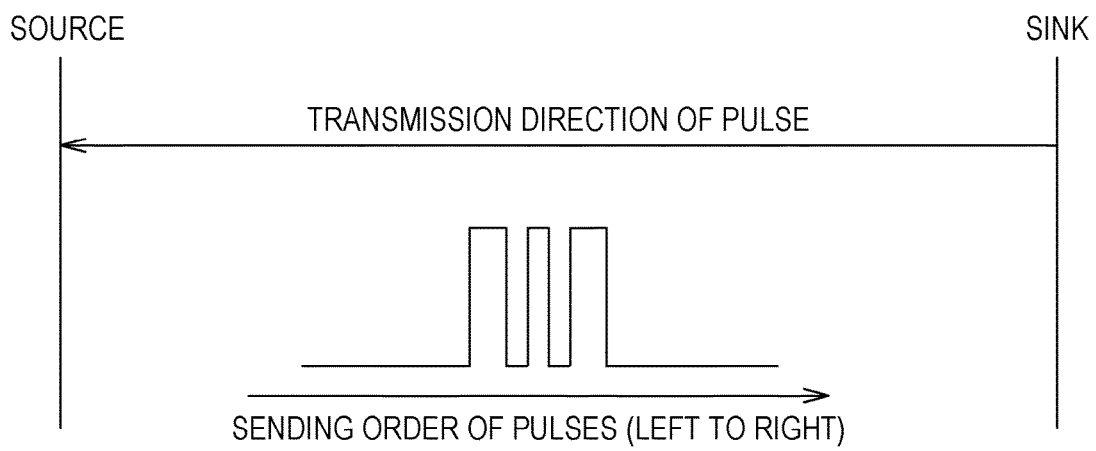
FIG. 18 is a diagram illustrating an example of a response pulse which is sent to the MHL transmitting unit in a case where an upper limit current value on the MHL receiving unit side is 0.5 A.

The response pulse is configured to have long pulses Pa and Pb before and after zero to three short pulses Pc so as to interpose the short pulses therebetween. The MHL receiving unit 204 determines the first long pulse Pa as a start (STX) of the transmission and the last and next long pulse Pb as an end (ETX) of the transmission, and can find out the upper limit current value by counting the number of the short pulses Pc between the long pulses. FIGS. 17(*a*), (*b*), (*c*), and (*d*) illustrate response pulses showing that the upper limit current values are 0 A, 0.5 A, 0.9 A, and 1.5 A, respectively. FIG. 18 illustrates an example of the response pulse which is sent to the MHL transmitting unit 108 in a case where the upper limit current value on the MHL receiving unit 204 side is 0.5 A.

[Request from Sink to Source (Inquiry)]

In addition, in the above description, the upper limit current value request pulse as the inquiry signal is sent to the MHL receiving unit (MHL sink) 204 of the television 200 from the MHL transmitting unit (MHL source) 108 of the mobile phone 100. With respect to this, the response pulse as the response signal returns to the MHL transmitting unit 108 from the MHL receiving unit 204. However, in contrast, a configuration is considered, in which the inquiry signal is sent to the MHL transmitting unit (MHL source) 108 of the mobile phone 100 from the MHL receiving unit (MHL sink) 204 of the television 200 and, with respect to this, the response signal returns to the MHL receiving unit 204 from the MHL transmitting unit 108.

For example, a battery power-level request pulse as the inquiry signal is sent to the MHL transmitting unit (MHL source) 108 of the mobile phone 100 from the MHL receiving unit (MHL sink) 204 of the television 200. For example, as in the upper limit current value request pulse in FIG. 14 described above, a 4-bit command in the battery power-level request pulse means a battery power-level request. For example, replacement with "1010" is performed.

In this case, the MHL transmitting unit 108 uses the response pulse as illustrated in FIG. 15 described above as the battery power level and respond to the MHL receiving unit 204. In the response pulse, the 4-bit response indicates that, for example, a tens place of the battery power level (%) is designated. For example, in a case where the battery power level is 80%, the 4-bit response is "1000(8)". In a case where the battery power level is 100%, the 4-bit response is "1010(10)".

On the MHL receiving unit (MHL sink) 204 side, that is, the television 200, which receives the response pulse of the battery power level, the control unit 201 generates OSD display data based on the battery power-level information and performs display of the battery power level of the mobile phone 100 on a predetermined portion, for example, on a corner of a screen, of the display panel 209. In this way, a user who views the television 200 can easily know the battery power level and thus, charging progress of the mobile phone 100. Then, the transmission of the battery power-level request pulse from the television 200 to the mobile phone 100 may be automatically performed periodically, or may be performed in response to a user's intentional operation.

Here, a mechanism is described, in which a pulse is transmitted using the CBUS between the MHL receiving unit (MHL sink) 204 and the MHL transmitting unit (MHL source) 108. Here, the MHL receiving unit 204 is described as a "SINK" and the MHL transmitting unit 108 is described as a "SOURCE".

Figure 19:
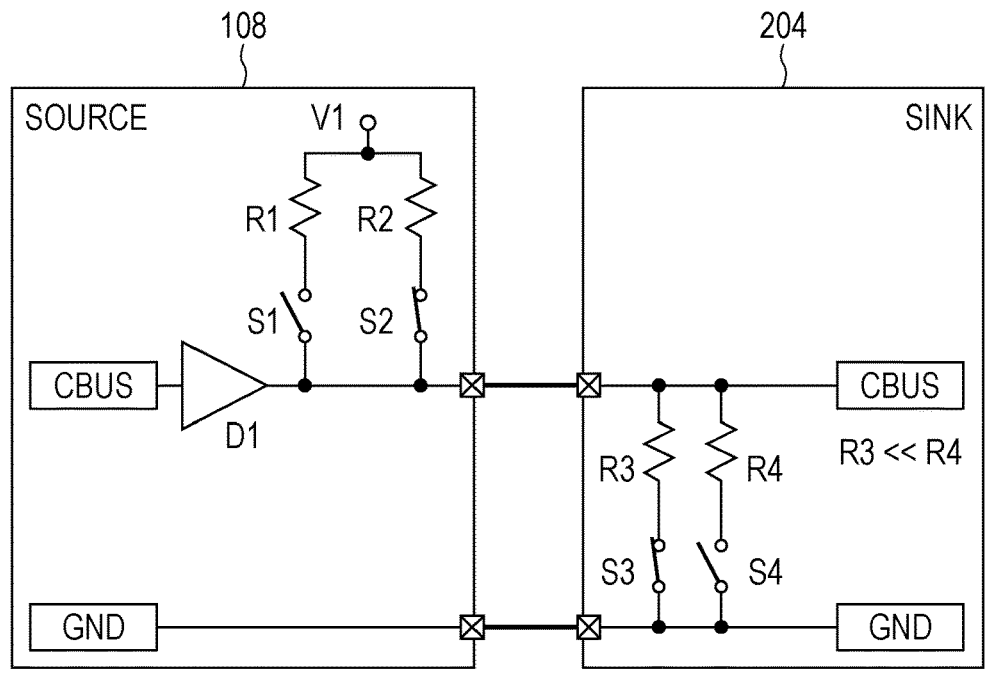
FIG. 19 is a diagram for illustrating a mechanism in which a pulse is transmitted between the MHL receiving unit and the MHL transmitting unit using the CBUS.

As described above, when the sink is in "SNK2" (standby state), the source is in "SRC2" (inactive state). At this time, as illustrated in FIGS. 19, R2 and R3 are connected. In addition, a resistance value of R4 is sufficiently greater than that of R3. A case is considered, in which R3 is 1 kΩ and R4 is 100 kΩ. In a case where the pulse is sent to the sink from the source, a drive D1 is used. In addition, in a case where the pulse is sent to the source from the sink, switches S3 and S4 are opened and closed.

Figure 20:
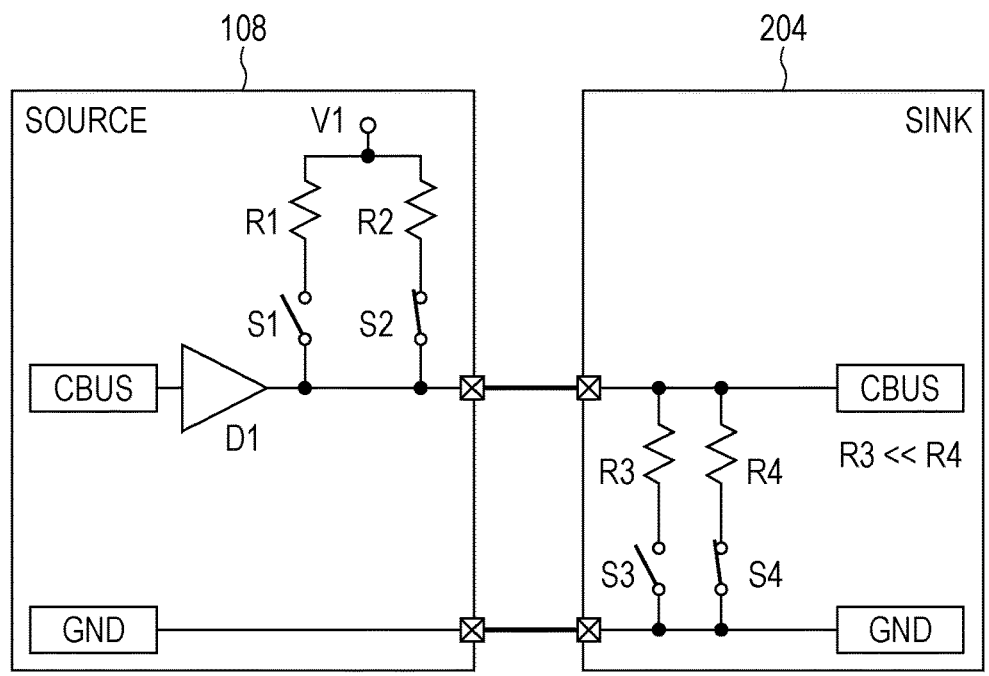
FIG. 20 is a diagram for illustrating another mechanism in which the pulse is transmitted between the MHL receiving unit and the MHL transmitting unit using the CBUS.

The state in FIG. 19 becomes a state in which S3 is closed, S4 is opened, and at this time, a voltage between CBUS–GND becomes low. In a case where the sink generates a pulse, R3 (1 kΩ) is switched to R4 (100 kΩ) when S3 is opened and S4 is closed as illustrated in FIG. 20. Therefore, the voltage between CBUS–GND is increased to be high. At this time, the source determines that a response pulse is issued from the sink. The sink performs transmission to the source by switching the switch opening/closing states; when the voltage is high, the transmission is performed as in FIG. 20 and, when the voltage is low, the transmission is performed as in FIG. 19.

Then, in a case where the pulse is sent to the source from the sink, there is provided another method in which, in addition to the switch opening/closing described above, for example, a drive D2 is added to a circuit on the sink side as illustrated in FIG. 21 and the drive is used.

In addition, in the above description, as the inquiry signal, an example of the upper limit current value request pulse and the battery power-level request pulse is shown. However, it is possible to consider another inquiry signal to the same. In a configuration of a request pulse generated in this case, for example, the 4-bit command in the upper limit current value request pulse in FIG. 14 described above is converted into a value which means the request.

FIG. 22 illustrates an example of a correlation between the value of the 4-bit command and the meaning thereof. For example, "1001" means the upper limit current value request and "1010" means the battery power-level request, as described above. Then, it is shown that "1011" to "1111" are reserved and are not used currently.

2. MODIFICATION EXAMPLE

Then, according to the embodiments described above, for example, an example is provided, in which the request pulse is sent through the CBUS and the response pulse in response to that is received through the CBUS. However, the response pulse may not return through the CBUS, necessarily. For example, in a case where the request pulse is sent to the MHL receiving unit (MHL sink) 204 from the MHL transmitting unit (MHL source) 108, it is considered that the MHL receiving unit (MHL sink) 204 returns the response pulse corresponding to the request pulse through the VBUS which is the power supply line.

In addition, according to embodiments described above, an example is provided, in which the MHL source device corresponds to the mobile phone 100 and the MHL sink device corresponds to the television 200. However, needless to say, a combination of the MHL source device and the MHL sink device is not limited thereto.

In addition, the present technology can achieve the following configuration.

(1) An electronic device includes a content data processing unit that is connected to an external device through a first line; and a communication unit that is connected to the external device through a second line, in which the communication unit transmits an inquiry signal to the external device through the second line in a state in which the first line is unavailable.

(2) In the electronic device according to (1) described above, the communication unit receives a response signal in response to the inquiry signal from the external device through the second line in a state in which the first line is unavailable.

(3) The electronic device according to (2) described above, further includes: a charging unit that is connected to a power supply unit of the external device through a third line; and a charging control unit that controls a charging operation of the charging unit, in which the inquiry signal indicates a signal generated to inquire current supply capability of the external device, and in which the charging control unit controls a value of a current which is drawn from the third line by the charging unit, in accordance with the response signal.

(4) In the electronic device according to (3) described above, the response signal contains information of an upper limit current value.

(5) In the electronic device according to (3) described above, the response signal contains information representing a type of upper limit current value.

(6) The electronic device according to (2) described above, further includes: a power supply unit that is connected to a charging unit of the external device through a third line; a display unit; and a display control unit that controls a display operation of the display unit, in which the inquiry signal indicates a signal generated to inquire a battery power level of the external device, and in which the display control unit displays battery power level information of the external device on the display unit, in accordance with the response signal.

(7) In the electronic device according to any one of (1) to (6) described above, the communication unit recognizes that the first line is in a state of being unavailable based on a resistance value between the second line and a ground line.

(8) A charging control method of an electronic device that includes a content data processing unit that is connected to an external device through a first line, a communication unit that is connected to the external device through a second line, and a charging unit that is connected to a power supply unit of the external device through a third line, the charging control method including: transmitting an inquiry signal generated to inquire current supply capability of the external device from the communication unit through the second line to the external device, receiving a response signal in response to the inquiry signal in the communication unit from the external device through the second line, and controlling a value of a current which is drawn from the third line by the charging unit, in accordance with the response signal, when the first line is in a state of being unavailable.

(9) A battery power-level display method of an electronic device that includes a content data processing unit that is connected to an external device through a first line, a communication unit that is connected to the external device through a second line, a power supply unit that is connected to a charging unit of the external device through a third line, and a display unit, the battery power-level display method including: transmitting an inquiry signal generated to inquire a battery power level of the external device from the communication unit through the second line to the external device, receiving a response signal in response to the inquiry signal in the communication unit from the external device through the second line, and displaying battery power level information of the external device on the display unit, in accordance with the response signal, when the first line is in a state of being unavailable.

(10) An electronic device includes: a digital interface unit that is connected to a digital interface unit of an external device through a transmission path, in which the digital interface unit includes a content data processing unit that is connected to the digital interface unit of the external device through a first line and a communication unit that is connected to the digital interface unit of the external device through a second line, and in which the communication unit transmits an inquiry signal to the digital interface unit of the external device through the second line when the digital interface unit of the external device is in a standby state.

(11) In the electronic device according to (10) described above, the communication unit receives a response signal in response to the inquiry signal from the digital interface unit of the external device through the second line when the digital interface unit of the external device is in the standby state.

(12) In the electronic device according to (10) or (11) described above, the digital interface indicates an interface having a mobile high-definition link (MHL) standard.

(13) A source device includes: a content data transmitting unit that is connected to a sink device through a first line; a communication unit that is connected to the sink device through a second line; a charging unit that is connected to a power supply unit of the sink device through a third line; and a charging control unit that controls a charging operation of the charging unit, in which, when the first line is in a state of being unavailable, the communication unit transmits an inquiry signal generated to inquire current supply capability of the sink device through the second line and receives a response signal in response to the inquiry signal from the source device; and in which the charging control unit controls a value of a current which is drawn from the third line by the charging unit, in accordance with the response signal.

(14) A sink device includes: a content data receiving unit that is connected to a source device through a first line; a communication unit that is connected to the source device through a second line; a power supply unit that is connected to a charging unit of the source device through a third line; a display unit; and a display control unit that controls a display operation of the display unit, in which, when the first line is in a state of being unavailable, the communication unit transmits an inquiry signal generated to inquire a battery power level of the source device through the second line to the source device and receives a response signal in response to the inquiry signal from the source device, and in which the display control unit displays battery power level information of the external device on the display unit, in accordance with the response signal.

REFERENCE SIGNS LIST

10 IMAGE DISPLAY SYSTEM
100 MOBILE PHONE
101 CONTROL UNIT
102 USER OPERATION SECTION
103 DISPLAY UNIT
104 3G/4G MODEM
105 CAMERA UNIT
106 RECORDING/REPRODUCING UNIT
107 TRANSMISSION PROCESSING UNIT
108 MHL TRANSMITTING UNIT (MHL SOURCE)
109 MHL TERMINAL
110 CHARGING CIRCUIT
111 BATTERY
200 TELEVISION
201 CONTROL UNIT
202 USER OPERATION UNIT
203 MHL TERMINAL
204 MHL RECEIVING UNIT (MHL SINK)
205 TUNER
206 ANTENNA TERMINAL
207 SWITCHING UNIT
208 DISPLAY PROCESSING UNIT
209 DISPLAY PANEL
210 VOLTAGE REGULATOR CIRCUIT
300 MHL CABLE

The invention claimed is:

1. An electronic device, comprising:
 circuitry configured to:
  connect to an external device via a first line,
   wherein the first line is for transmission of content data;
  connect to the external device via a second line; and
  transmit an inquiry signal to the external device via the second line, based on the first line that is unavailable due to a standby state of the external device,
   wherein the inquiry signal comprises a plurality of pulses that are transmitted in a sequence,
   wherein a width of each of a first plurality of pulses of the plurality of pulses ranges from 20 ms to 60 ms, and
   wherein a width of each of a second plurality of pulses of the plurality of pulses is 0.1 ms.

2. The electronic device according to claim 1, wherein the circuitry is further configured to receive a response signal based on the inquiry signal from the external device via the second line.

3. The electronic device according to claim 2, wherein the circuitry is further configured to:
 connect to a power supply circuit of the external device via a third line; and
 control a charging operation of a battery connected to the circuitry,
  wherein the inquiry signal indicates a signal generated to inquire current supply capability of the external device, and
 control, based on the response signal, a value of a current which is drawn from the third line by the battery.

4. The electronic device according to claim 3, wherein the response signal contains information of an upper limit for the value of the current.

5. The electronic device according to claim 3, wherein the response signal contains information related to an upper limit for the value of the current from a plurality of set upper limit current values.

6. The electronic device according to claim 2, further comprising:
 a display panel,
 wherein the circuitry is further configured to:
  connect to a charging circuit of the external device via a third line;

control a display operation of the display panel,
wherein the inquiry signal indicates a signal generated to inquire a battery power level of the external device; and
control the display panel to display battery power level information of the external device, based on the response signal.

7. The electronic device according to claim 1, wherein the circuitry is further configured to recognize, that the external device is in the standby state, based on a resistance value between the second line and a ground line.

8. A method, comprising:
in an electronic device:
connecting to an external device via a first line,
wherein the first line is for transmission of content data;
connecting to the external device via a second line;
connecting to a power supply circuit of the external device via a third line;
transmitting an inquiry signal, generated to inquire current supply capability of the external device, via the second line to the external device based on the first line that is unavailable due to a standby state of the external device,
wherein the inquiry signal comprises a plurality of pulses that are transmitted in a sequence,
wherein a width of each of a first plurality of pulses of the plurality of pulses ranges from 20 ms to 60 ms, and
wherein a width of each of a second plurality of pulses of the plurality of pulses is 0.1 ms;
receiving a response signal based on the inquiry signal from the external device via the second line; and
controlling, based on the response signal, a value of a current which is drawn from the third line.

9. A method, comprising:
in an electronic device:
connecting to an external device via a first line,
wherein the first line is for transmission of content data;
connecting to the external device via a second line;
connecting to a charging circuit of the external device via a third line;
transmitting an inquiry signal, generated to inquire a battery power level of the external device, via the second line to the external device,
wherein the inquiry signal comprises a plurality of pulses that are transmitted in a sequence,
wherein a width of each of a first plurality of pulses of the plurality of pulses ranges from 20 ms to 60 ms, and
wherein a width of each of a second plurality of pulses of the plurality of pulses is 0.1 ms;
receiving a response signal based on the inquiry signal from the external device via the second line; and
displaying battery power level information of the external device on a display panel of the electronic device, based on the response signal.

10. An electronic device, comprising:
first circuitry configured to:
connect to second circuitry of an external device via a transmission path,
wherein third circuitry included in the first circuitry is configured to connect to the second circuitry of the external device via a first line,
wherein the first line is for transmission of content data, and
wherein fourth circuitry included in the first circuitry is configured to connect to the second circuitry of the external device via a second line;
and
transmit an inquiry signal to the second circuitry of the external device via the second line based on the second circuitry of the external device that is in a standby state,
wherein the inquiry signal comprises a plurality of pulses that are transmitted in a sequence,
wherein a width of each of a first plurality of pulses of the plurality of pulses ranges from 20 ms to 60 ms, and
wherein a width of each of a second plurality of pulses of the plurality of pulses is 0.1 ms.

11. The electronic device according to claim 10, wherein the first circuitry is further configured to receive a response signal, based on the inquiry signal, from the second circuitry of the external device via the second line.

12. The electronic device according to claim 10, wherein the first circuitry is an interface with a mobile high-definition link (MHL) standard.

13. A source device, comprising:
circuitry configured to;
connect to a sink device via a first line,
wherein the source device is configured to transfer content to the sink device;
connect to the sink device via a second line;
transmit an inquiry signal, generated to inquire current supply capability of the sink device, via the second line;
receive a response signal based on the inquiry signal from the source device,
wherein the inquiry signal comprises a plurality of pulses that are transmitted in a sequence,
wherein a width of each of a first plurality of pulses of the plurality of pulses ranges from 20 ms to 60 ms, and
wherein a width of each of a second plurality of pulses of the plurality of pulses is 0.1 ms;
connect to a power supply circuit of the sink device via a third line;
control a charging operation of a battery connected to the circuitry; and
control, based on the response signal, a value of a current which is drawn from the third line by the battery.

14. A sink device, comprising:
a display panel; and
circuitry configured to:
connect to a source device via a first line, wherein the sink device is configured to receive content from the source device;
connect to the source device via a second line;
transmit an inquiry signal, generated to inquire a battery power level of the source device, via the second line to the source device;
receive a response signal based on the inquiry signal from the source device,
wherein the inquiry signal comprises a plurality of pulses that are transmitted in a sequence,
wherein a width of each of a first plurality of pulses of the plurality of pulses ranges from 20 ms to 60 ms, and
wherein a width of each of a second plurality of pulses of the plurality of pulses is 0.1 ms;
connect to a battery of the source device via a third line;

control a display operation of the display panel; and
display battery power level information of the source device on the display panel, based on the response signal.

* * * * *